Nov. 22, 1966   J. A. PERRY   3,287,624
TAP CHANGING TRANSFORMER VOLTAGE REGULATING SYSTEM
Filed Oct. 22, 1963   3 Sheets-Sheet 1

INVENTOR.
JOHN A. PERRY
BY
McLean and Boustead
ATTORNEYS

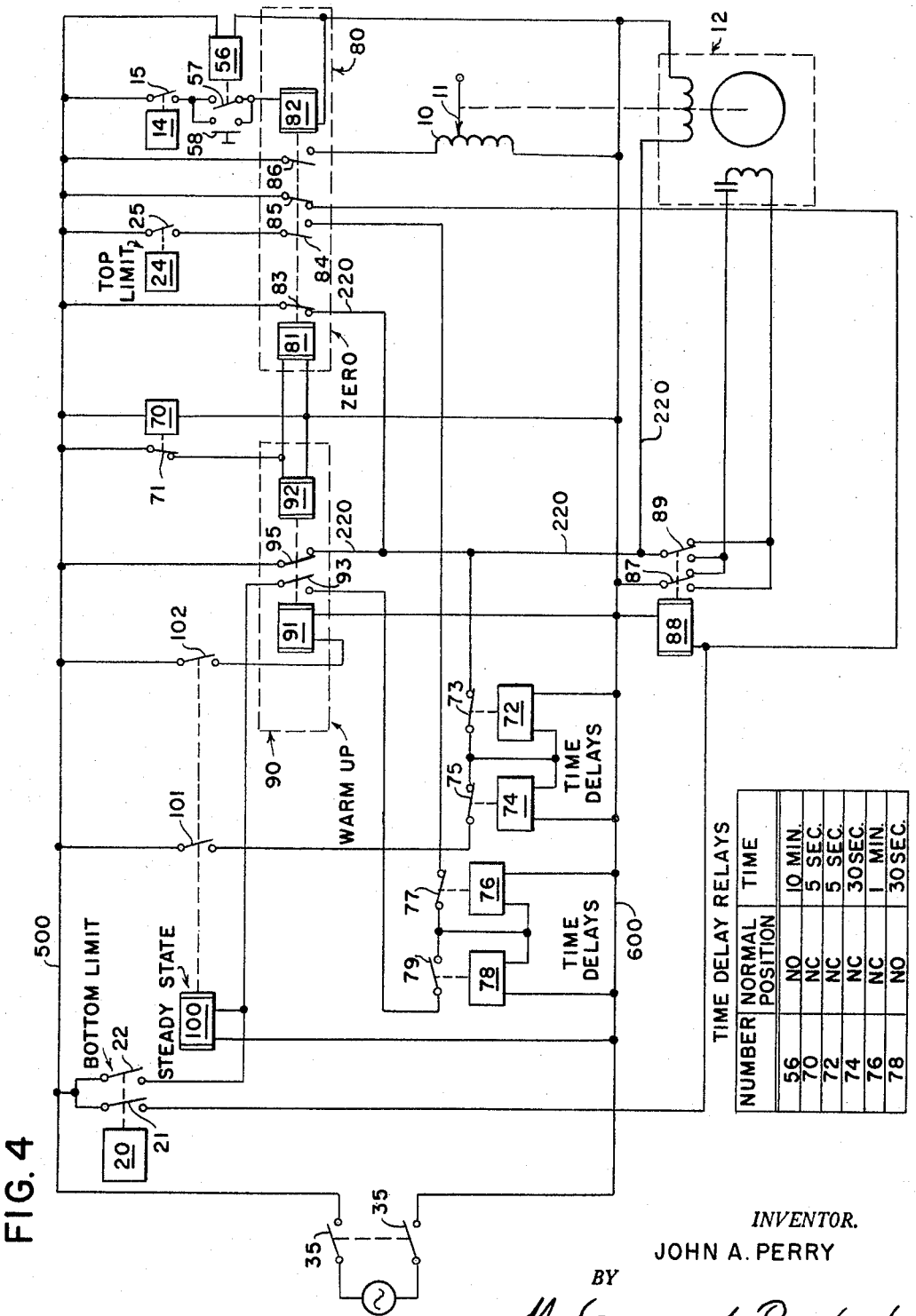

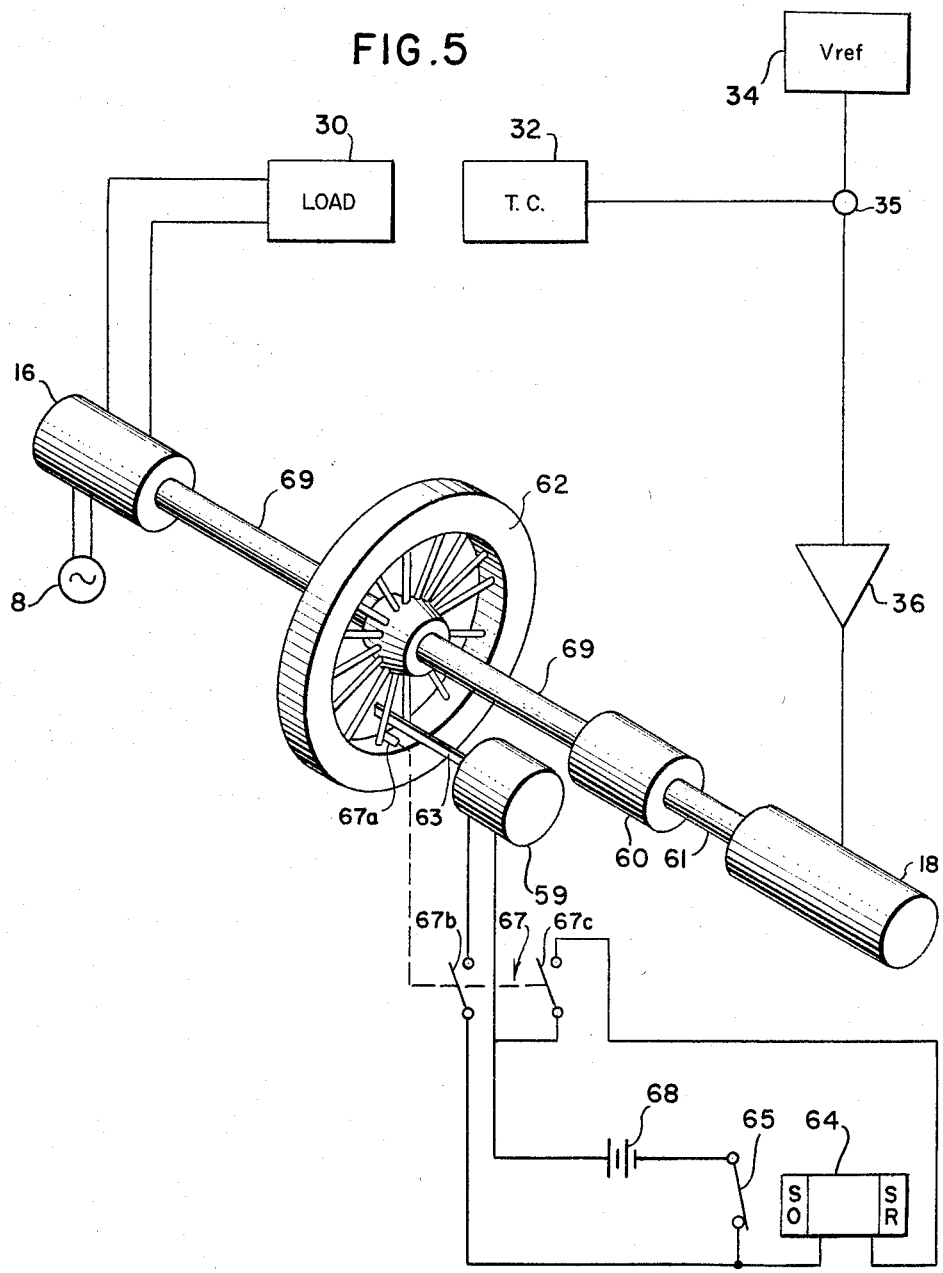

United States Patent Office 3,287,624
Patented Nov. 22, 1966

3,287,624
TAP CHANGING TRANSFORMER VOLTAGE REGULATING SYSTEM
John A. Perry, Lansing, Ill., assignor to Sinclair Research, Inc., New York, N.Y., a corporation of Delaware
Filed Oct. 22, 1963, Ser. No. 317,992
11 Claims. (Cl. 323—43.5)

My invention relates to control of process variables and in particular provides an energy proportioning control system for electrical power circuits employed to control process variables such as temperature.

It has heretofore been known to control the magnitude of electrical energy, e.g. by voltage magnitude control, utilizing a pair of variable impedance elements connected both serially and in parallel in which one impedance is utilized for coarse regulation and one for fine regulation of voltage magnitude.

An object of my invention is to provide an automatically controlled output potential by means of coarse and fine range variable impedance devices characterized respectively by broad and narrow ranges of potential and automatic adjustment of impedance to produce an optimum adjustment for each desired potential selected by a program control circuit.

In another aspect of my invention it is an object to provide a control system, responsive to programming devices, which provides adjustments of voltage magnitude without hunting or periodic application of potential to the output circuit, by means of an inexpensive, stepless, energy proportioning, control system, operable without previously matching the capacities of the power supply and the load.

In particular, my invention is applicable to temperature controllers for providing selected temperatures as a function of time in order that a process can be automatically adjusted to a succession of different and carefully regulated temperatures.

Briefly, one aspect of my invention contemplates a pair of variable impedance devices interconnected between a power supply and an electrical load such as a heating element.

The first impedance device has its input connected to the power supply, while the second impedance device has its input connected to or additive with the output of the first device and its output connected to the load. The two impedance devices are selected with regard to the range of available impedance so that the first impedance provides coarse control while the second provides fine control of the voltage applied to the load.

Each impedance device is provide with a drive mechanism connected to it to change its output potential. Limit sensing devices are associated with the fine control impedance device. One sensing device is positioned to be actuated by the fine control impedance device at a position of maximum output potential and is connected to the drive mechanism of the coarse control impedance device to actuate such drive mechanism to increase the output potential of the coarse control impedance device a limited amount when such sensing device is actuated. Similarly, the other sensing device associated with the fine control impedance is positioned to be actuated by the fine control impedance device at a position of minimum output potential and is connected to the drive mechanism of the coarse control impedance device to decrease the output potential of the coarse control impedance device a limited amount when such other sensing device is actuated.

The position of the drive mechanism of the fine control impedance device is controlled by a control system which sends either increase or decrease signals to such drive mechanisms in response to departures of the process variable controlled by the load from a preselected value, e.g. a fixed or variably controlled reference standard.

During the initial period of operation, a preferred embodiment of my invention provides for zeroing of the coarse control impedance device before adjustment to the normal power level.

A still further preferred embodiment of my invention provides for connecting several heater elements in parallel upon initial warm-up and then connecting such elements in series upon the first traverse of the fine control impedance device to minimum output, actuating the minimum limit sensing device.

In another aspect of my invention, I have found it desirable to provide a control system for operating a controlled element, such as an impedance device, to minimize hunting and overshooting in situations of substantial change of output conditions. In accordance with this aspect of my invention, I provide a control system including a control circuit, a controlled element, and a position adjusting device, with the control circuit connected to actuate the position adjusting device, the position adjusting device being connected to drive the controlled element upon actuation of the position adjusting device. Means are provided which are actuable to interrupt adjustment of the position of the controlled element by the position adjusting device. Additional means are provided so that such interrupting means are automatically actuated for predetermined periods.

One form of the above control system for regulating a controlled element includes a drive mechanism connected to be actuated by a servo control system for adjusting the tap position of a fine control impedance device. Associated with the fine control impedance are a pair of limit switches indirectly connected through time delay circuit breaking means to a second drive mechanism for adjusting the tap position of a coarse impedance, thereby providing a maximum limitation on the rate of adjustment of the tap position of the coarse control impedance device.

An alternative control system for controlling the tap element of a variable control impedance device to minimize hunting includes a system in which the position of the tap of a variable impedance device is adjusted by a control system such as that described above or the like. However, the drive mechanism and the shaft of the variable control impedance device are connected by a slip connection. A limit device, for example a flywheel with spokes mounted on the shaft connected to the tap of the variable impedance device and a solenoid having a core used as a detent spring biased to engage with the spokes of the flywheel operates to impede adjustment of the tap, periodically. A time delay circuit breaking device and a switch actuated by spokes of the flywheel connected in series with the source of excitation for the solenoid cause the detent to be retracted from between the spokes at periodic intervals. The detent retraction period controls the rate of adjustment of the position of the tap, while the slip connection permits free rotation of the servo motor in the intervals between such signals. The circuit minimizes hunting and provides even power supply to the load tending to overcome process lags in a controlled heating system or the like.

For a more complete description of my invention, reference is made to the appended drawings in which:

FIGURE 4 is a schematic diagram of circuitry in accordance with my invention common to each of the circuits in FIGURES 1-3; and FIGURE 5 is a diagrammatic view illustrating a still further arrangement in accordance with my invention.

Figure 1:
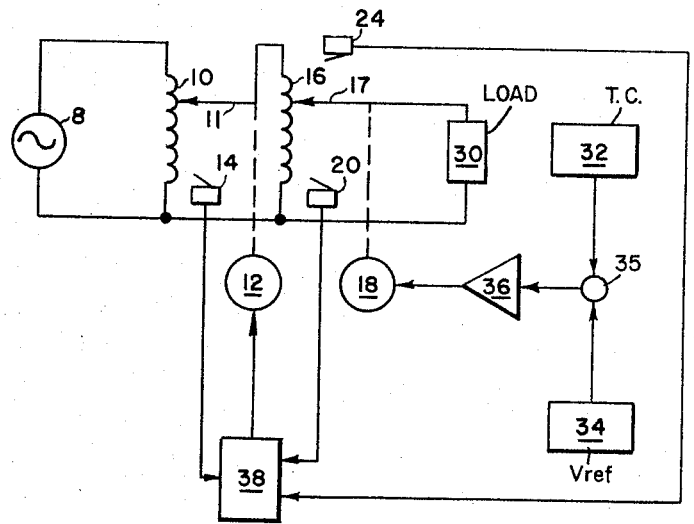
FIGURE 1 is a schematic diagram of an electrical circuit in accordance with my invention.
Figure 2:
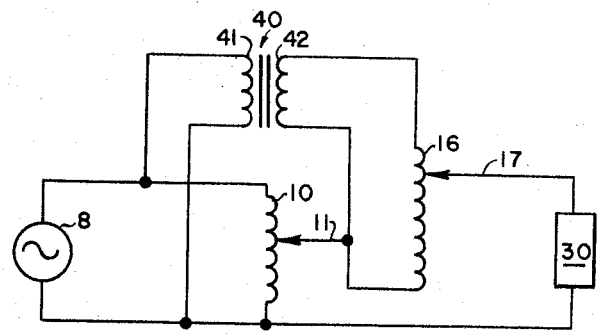
FIGURE 2 is a schematic diagram of another electrical circuit in accordance with my invention.
Figure 3:
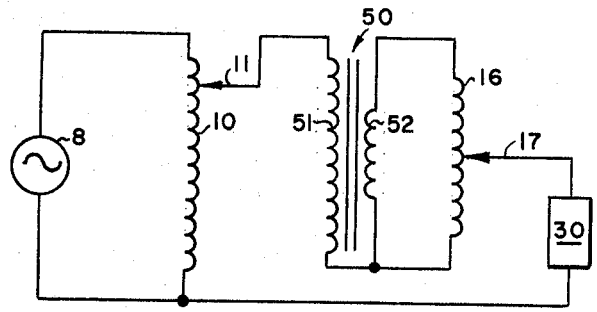
FIGURE 3 is a third schematic diagram of still another circuit in accordance with my invention.

Referring to FIGURES 1, 2 and 3, in accordance with my invention a pair of variable impedances, such as an autotransformer 10 and an autotransformer 16, are connected between a power supply 8 and a load 30 in a manner permitting one, for example, autotransformer 10, to be connected such that it can provide greater variation in the potential applied to the load (and hence operates as a "course" control) than the other, for example autotransformer 16 in the illustrated cases, which is capable of relatively small variation in the potential applied to load 30 (and hence is used for "fine" control). FIGURES 1, 2, and 3 illustrate three different ways in which such power control impedances can be connected between a power supply and a load.

Thus in FIGURE 1 autotransformers 10 and 16 are connected in cascade with the output of coarse control autotransformer 10 applied directly as an input for fine control autotransformer 16. In FIGURE 2 the two autotransformers are connected in parallel across power supply 8 with their outputs algebraically combined. FIGURE 3 represents a variation in which the outputs are algebraically combined but autotransformers 10 and 16 are also connected in cascade. Other variations are, of course, available and the choice of the particular circuit by which a pair of impedances, such as autotransformers 10 and 16, are connected to provide coarse and find control of the application of power to a load is not specifically of concern to my invention.

Referring more particularly to FIGURE 1 it will be noted that autotransformer 10 has its coil connected across power supply 8 such that the potential applied to autotransformer 10 is connected to the output of power supply 8. In this cascade arrangement the coil of autotransformer 16 is thus connected between output tap 11 on autotransformer 10 and one side of autotransformer 10, such that the potential applied across autotransformer 16 is determined by the position of tap 11, which for reasons which will become apparent hereinafter, can be conveniently designated as a "slave" tap. Similarly load 30 is connected between one side of autotransformer 16 and its variable tap 17 such that the output of transformer 16 applied to load 30 is determined by the position of tap 17, which for convenience can be described as a "master" tap.

In the circuit of FIGURE 2, autotransformer 10 is connected across power supply 8, as before, while, however, autotransformer 16 is connected across secondary winding 42 of a step-down transformer 40, primary winding 41 of which is connected across power supply 8. In this arrangement slave tap 11 is connected to one side of autotransformer 16 while load 30 is connected between master tap 17 and one side of autotransformer 10, such that the outputs of autotransformers 10 and 16 are algebraically combined across load 30.

In the circuit of FIGURE 3 autotransformer 10 is connected across power supply 8 while autotransformer 16 is connected across secondary winding 52 of a step-down transformer 50, primary winding 51 of which is connected on one side to slave tap 11 and on the other side to one of the connections between secondary winding 52 and autotransformer 16. In this arrangement load 30 is connected between master tap 17 and one side of autotransformer 10.

In each of the circuits shown in FIGURES 1, 2, and 3, a control circuit is employed to operate the positions of master tap 17 and slave tap 11 in accordance with the condition of a parameter of the load. This circuit is generally included in FIGURE 1 only for convenience, although it will be understood the same circuit is employed to control the positions of master tap 17 and slave tap 11 in each of the circuits in FIGURES 2 and 3 also.

Referring to FIGURE 1, the condition to be controlled, e.g. temperature of a furnace, is measured by a transducer, such as thermocouple 32 or other temperature sensing element. The output of thermocouple 32 is compared in error detector 35 with a predetermined fixed or variable reference potential supplied by reference source 34 to produce an error signal which is coupled to the input of an amplifier 36. The error signal will be referred to as a "raise" signal when the temperature of load 30 is lower than desired and as a "lower" signal when the temperature is greater than desired. The error signal, amplified by amplifier 36, is impressed across the terminals of a master motor 18, which has its output shaft connected to master tap 17, to raise master tap 17 for "raise" signals and to lower master tap 17 for "lower" signals. To such extent it will be apparent the control system is largely a conventional servo mechanism.

When master tap 17 reaches an extreme position at either end of "fine" autotransformer 16, in accordance with my invention, the output of "coarse" autotransformer 10 is then adjusted to reach the desired condition of operation. To these ends a pair of limit switches 20 and 24 is associated with master tap 17 to control a motor 12, the output shaft of which is connected to slave tap 11, to adjust the position of slave tap 11.

Limit switch 24 is positioned to be actuated and operate a control circuit 38 which it is part when master tap 17 reaches a maximum position, i.e. when there continues to be a "raise" signal after master tap 17 has been raised sufficiently to supply the maximum output potential possible for a given position of slave tap 11. When switch 24 is thus actuated, control circuit 38 connects power to motor 12, which then drives slave tap 11 in a direction increasing the output of coarse autotransformer 10 until switch 24 is released when tap 17 is later lowered. Similarly, switch 20 is positioned to be actuated when tap 17 reaches a minimum position, and operates circuit 38 to connect power to motor 12 in a manner causing tap 11 to be driven in a direction decreasing the output of coarse autotransformer 10.

Preferably a third limit switch 14 is positioned to be actuated when slave tap 11 reaches its minimum position and is connected to control circuit 38 to indicate when slave tap 11 is in its "zero" position as will be later discussed particularly with reference to FIGURE 4. Control circuit 38 also preferably provides time delays during adjustments of slave tap 11 in order to prevent overshooting, hunting and radical over adjustment of power output. Such an erratic operation is characteristic of thermal systems in which delay lags within the system to be controlled lead to instability of the steady-state operation of the system.

Control circuit 38, moreover, preferably controls the initial zeroing and warm-up function usually accomplished manually. Slave tap 11 is thus raised periodically until the "raise" signal becomes zero where the error signal changes to a "lower" signal because of either overheating or a change in the desired condition of operation as reflected by adjustment of the reference potential by a program control or the like.

For a "lower" signal, the servo-loop operates, lowering master tap 17 and releasing switch 24. The "lower" signal can continue until master tap 11 has reached the lower end of fine autotransformer 16 causing minimum limit switch 20 to actuate, lowering slave tap 11 with intermittent time delays.

The cascade arrangement shown in FIGURE 1 presupposes switch 20 will be positioned at some point, say 90%, along the path of master tap 17 toward maximum output. Assuming transformers 10 and 16 are identical, sensitivity of fine autotransformer 16 is greatest at high output positions of tap 11 and declines as output potential decreases. The use of step-down transformer 40 in the circuit of FIGURE 2 makes fine autotransformer 16 much more sensitive because the total potential drop across fine autotransformer 16 and the potential drop from winding to winding on it has been decreased by the turns ratio of step-down transformer 40. In the circuit of FIGURE 3 there is an increase in sensitivity by reason of the use of transformer 50, as in the circuit of FIGURE 2, sensitivity is also a function of the position of coarse autotransformer 10, as in FIGURE 1.

The sensitivity of these circuits can be calculated by assuming that both autotransformers have $n$ turns, that the isolation transformers have a turns ratio of $R$, and letting $k$ be the ratio of coarse autotransformer output voltage to coarse autotransformer input voltage, i.e. proportional to the setting of the slave tap 11 and $V$ be the input potential to coarse autotransformer 10.

Thus, in the circuit of FIGURE 1, the sensitivity of fine autotransformer 16 is $kV/n$, volts/turn; in the circuit of FIGURE 2, the sensitivity of fine autotransformer 16 is $$\frac{RV \text{ volts}}{n \text{ turn}}.$$

while in the circuit of FIGURE 3, the sensitivity of fine autotransformer 16 is $kRV/n$ volts/turn. For a secondary to primary turns ratio, $R$, of $1/10$, a fine autotransformer 16 in FIGURE 3 is 10 times $(1/R)$, more sensitive than in the circuit of FIGURE 1, whereas in the circuit of FIGURE 2 it is $10k$ $(k/R)$, more sensitive than the master of FIGURE 1 with the ratio decreasing as slave tap 11 lowers thereby decreasing. $k$.

Referring more particularly to FIGURE 4, which shows a suitable control circuit 38 as well as power supply 8, slave 10, motor 12, and switches 14, 20 and 24, circuit 38 includes a safety relay 56, a start-up relay 70, four proportioning relays 72, 74, 76 and 78, a zeroing relay 80, a slave motor reversing relay 88, a warm-up relay 90 and a steady-state control relay 100.

Power supply 8 is connected to energize the various above noted elements of circuit 38 as well as slave 10 and motor 12 through a d.p.s.t. control switch 35 leading to bus bars 500 and 600 across which the various elements are connected.

Safety relay 56 is a time delay relay having associated with it a single pair of normally opened contacts 57 which close ten minutes after energization of the winding of relay 56.

Start-up relay 70 has a pair of normally closed contacts 71 and operates after a predetermined time delay (five seconds) to open such contacts upon energization of its winding.

Relay 72 has associated with it a single pair of normally closed contacts 73; relay 74 has associated with it a single pair of normally closed contacts 75; relay 76 has associated with it a single pair of normally closed contacts 77; and relay 78 has associated with it a single pair of normally open contacts 79. Each of relays 72, 74, 76 and 78 is operable to actuate the pair of contacts associated with it off of their normal position after a time delay of, respectively, five seconds, thirty seconds, one minute and thirty seconds.

Zeroing relay 80 is a latching relay having a pair of opposed windings 81 and 82 and four associated contact pairs 83, 84, 85 and 86, contact pairs 83 and 85 being normally closed and contact pairs 84 and 86 being normally open subsequent to energization of winding 81, while energization of winding 82 opens contact pairs 83 and 85 and closes contact pairs 84 and 86. Relay 88 has associated with it two groups 87 and 89 of three contacts each, each contact group including a pole movable between two contacts, one normally open and one normally closed.

Warm-up relay 90 is a latching relay having a pair of opposed windings 91 and 92 with which are associated two pairs of contacts 93 and 95, contact pair 93 being normally closed and contact pair 95 being normally open subsequent to energization of winding 91, while energization of winding 92 opens contact pair 93 and closes contact pair 95.

Steady-state relay 100 has associated with it two pairs of normally open contacts 101 and 102 which are closed upon energization of the winding of relay 100.

Bottom limit switch 14 has associated with it a single pair of normally open contacts 15 which are closed upon actuation of switch 14 when engaged by slave tap 11. Bottom limit switch 20 has associated with it two pairs of normally open contacts 21 and 22 which are closed upon master tap 17 engaging bottom limit switch 20. Top limit switch 24 has associated with it a single pair of normally open contacts 25 which are closed upon actuation of switch 24 when it is engaged by master tap 17.

Windings 81 and 92 of relays 80 and 90 respectively are connected in parallel between bus bars 500 and 600 through contact pair 71 of start-up relay 70, the winding of which is connected directly across bus bars 500 and 600. Winding 82 is connected between bus bars 500 and 600 serially through contact pair 15 of switch 14 and contact pair 57 of safety relay 56, the winding of which is connected directly between bus bars 500 and 600. Also a normally open, spring biased, push-button switch 58 is connected shunting contact pair 57.

Motor reversing relay 88 has its winding connected between bus bars 500 and 600 through contact pair 85 associated with relay 80 and alternately through contact pair 21 of bottom limit switch 20. Contact pairs 83 and 95 are connected in parallel between bus bar 500 and a common line 220 which is connected through the main winding of motor 12 to bus bar 600. Motor 12 preferably is a reversible shaded pole induction motor with four wire control. Consequently common line 220 is also connected through the capacitor winding of motor 12 to bus bar 600, contact groups 87 and 89 of relay 88 being connected in the latter circuit to permit phase reversal in the capacitor winding such that motor 12 is reversible. Normally (relay 88 being unactuated) motor 12 when energized moves tap 11 up. A third connection from bus bar 500 to common line 220 is provided by a series connection from bus bar 500 through contact pair 101, contact pair 75, and contact pair 73. The windings of relays 72 and 74 are connected in parallel between bus bar 600 and the common connection between contact pairs 73 and 75.

Winding 91 is connected between bus bars 500 and 600 through contact pair 102 of steady-state relay 100, the winding of which is connected between bus bars 500 and 600 through contact pair 22 of bottom limit switch 20. The windings of relays 76 and 78 are connected in parallel between bus bars 500 and 600 through two circuits; in one case through the serial connection between such bus bars of contact pair 22 of bottom limit switch 20, contact pair 93 of latching relay 90, contact pair 79 of relay 78 and the parallel connection of the winding of relays 76 and 78, and in the other case through the serial connection between such bus bars of contact pair 25 associated with top limit switch 24, contact pair 84 of latching relay 80, contact pair 77 of relay 76 and the parallel connection of the windings of relays 76 and 78. It will be noted that these circuits also provide a possible circuit for energization of relay 100 through contact pair 25 of top limit switch 24.

Coarse autotransformer 10 is connected between bus bars 500 and 600 through contact pair 86 of relay 80.

Control circuit 38 illustrated in FIGURE 4 is intended to zero slave tap 11 prior to warm-up while disconnecting load 30 for a fixed period of time sufficient to exceed the zeroing time, to provide a period of warm-up during which slave tap 11 is raised rapidly to approximate the desired position, and then to provide steady-state control with intermittent time delays between adjustments to minimize erratic adjustment of the output potential.

*Zeroing*

Upon closing switch 35, relays 70 and 56 are actuated. Relay 70 resets latching relays 80 and 90 to latched positions at the commencement of each run by connecting windings 81 and 92 of relays 80 and 90 respectively between bus bars 500 and 600 through contacts 71 of start-up-time-delay relay 70, thereby closing the power circuits to those windings. When zeroing relay 80 latches, its contact pairs 83 and 85 are closed and its contact pairs 84 and 86 are opened. Contact pair 83 supplies power to slave motor 12 through line 220, and the contact groups 87 and 89 of reversing relay 88, while relay 88 is actuated through contact pair 85. Thus, motor 12 commences to lower slave tap 11 upon latching of latching relay 80.

Warm-up latching relay 90 which has also been actuated opens its contact pair 93 and closes its contact pair 95, the latter also supplying power to slave motor 12 and relay 88. Five seconds after operation is commenced, relay 70 operates to open contact pair 71, releasing windings 81 and 92.

The zeroing step ends when slave tap 11 bottoms on minimum-limit switch 14 closing contact pair 15 which, after saftey-time-delay relay 56 (with a time delay of ten minutes) for a 0.1 r.p.m. slave motor 12 and 360° autotransformer 10, closes and actuates winding 82 to reverse zeroing relay 80. Push-button switch 58 can be operated to override relay 56 in the event coarse autotransformer 10 bottoms substantially before relay 56 times out. Safety relay 56 is desirable, however, in the rare case in which limit switch 20 is actuated prior to the time that the zeroing step is completed.

*Warm-up*

When winding 82 is energized to reverse relay 80, it removes power from relay 88 by opening contact pair 85, supplies power to the coarse autotransformer 10 by closing contact pair 86, and sets up a potential circuit through contact pair 25 of limit switch 24 for energizing relay 100. The release of relay 88 causes motor 12 to reverse and start tap 11 moving to increase the potential between it and bus bar 600, as contact pair 95 remain closed even though contact pair 83 opened upon reversal of relay 80.

Slave tap 11 continues to be raised even though a "lower" signal is eventually produced at amplifier 36. The "lower" signal, however, causes motor 18 to drive tap 17 toward its minimum position until limit switch 20 is actuated and closes contact pairs 21 and 22 ending the warm-up cycle. (If switch 20 is actuated during the zeroing step there will be no warm-up cycle, and instead the circuit will immediately commence its steady-state cycle.)

*Steady-state operation*

Actuation of switch 20 causes the energization of relay 100 through closure of contact pair 22 and reverses relay 88 through closure of contact pair 21. The operation of relay 100 reverses relay 90 through closure of contact pair 102 and consequent energization of winding 91. Thus contact pair 95 is opened releasing the power circuit to motor 12, and contact pair 93 closes further setting up the potential circuit for energizing relay 100 through contact pair 84 of relay 80 and contact pair 25 of limit switch 24 of master 16.

Contact pair 101 of relay 100, which also closes upon actuation of switch 20, momentarily provides current to motor 12 through normally closed contact pairs 75 and 73 of time delay relays 74 and 72, respectively, which are simultaneously energized. Since relay 88 has operated, motor 12 will start to lower tap 11, in all probability releasing switch 20 before the energizing circuit through contact pair 101 is broken by opening of contact pair 73, which occurs five seconds after relay 72 is energized.

The release of switch 20 allows relay 100 and relay 88 to release, disabling motor 12 and leaving motor 12 in a position to drive tap 11 upward if again energized. Operation of motor 12 is thereafter governed by switches 20 and 24 whenever control of tap 17 of fine autotransformer 16 under the influence of the servo system carries tap 17 to one extreme or the other of master 16.

Thus movement of tap 17 to its maximum position trips switch 24 closing a circuit energizing relays 76 and 78. After thirty seconds contact pair 79 closes and energizes relay 100 with consequent upward movement of tap 11 through closure of the energization circuit for motor 12 by closure of contact pair 101.

On the other hand as tap 17 bottoms and actuates switch 20 both relays 100 and 88 are operated supplying energization for motor 12 through the same circuit involving contact pair 101, however driving motor 12 to lower tap 11, since relay 88 is also operated.

Thus either upward or downward movement of tap 11, while primarily under the control of switch 24 or 20, as the case may be, is secondarily under the control of time delay relays 74 and 72, whose respective contact pairs 75 and 73 open at thirty seconds and five seconds. After five seconds contact pair 73 opens stopping motor 12; after 25 seconds, contact pair 75 opens releasing both relays 72 and 74 which then release their associated contacts to repeat the intermittent movement of motor 12 until the limit switch 24 or 20 which operated relay 100 is opened.

Since immediately after warm-up the normal demand at load 30 is a prolonged drive upscale until equilibrium is obtained, upscale movement is further under the control of the additional time delayed interruptions imposed by relays 76 and 78 which control the actuation of relay 100 by switch 24. Thus, thirty seconds are required before relay 78 operates to close its circuit and energize relay 100. At the end of an additional thirty seconds relay 76 operates to break the energization circuit for both relays 76 and 78 which thereupon release and reoperate with the same cycling.

It is also desirable during warm-up to obtain greater heating rate by connecting two or more heating elements of load 30 in parallel, which on delatching of warm-up relay 90 are reconnected in series to decrease the heating rate and provide a more stable supply of heat requiring less adjustment of the autotransformers.

An alternate form of apparatus suitable in accordance with my invention for providing proportionate control through intermittent interruption of a corrective movement includes a controlled element, e.g. the tap on an autotransformer, which is adjusted by means of a motor releasably connected to the controlled element. In this case as before the motor is operated by a servo control system in response to variations in a load characteristic or in response to a program control, but an arrangement is provided to restrain movement of the controlled element periodically and thus prevent continuous adjustment of the controlled element. Overadjustment is thereby minified and a relatively smooth rate of adjustment assured. Such an apparatus is illustrated in FIGURE 5, including power source 8, autotransformer 16, load 30, transducer 32, reference source 34, error detector 35, amplifier 36 and motor 18 as well as a shaft 61, a friction drive connection 60, a shaft 69, a spoked wheel 62, a solenoid 59, a core 63, a relay 64 and a battery 68.

The input terminals of the autotransformer 16 are connected to the power supply 8 as in any of the circuits of FIGURES 1–3, or directly, and in any event such that variable autotransformer 16 supplies an adjustable output potential to load 30 by adjustment of the position of tap 17 in response to rotation of shaft 69 to which tap 17 is connected to be rotated thereby. Thermocouple transducer 32 is positioned adjacent load 30 as before to generate an output signal responsive to load temperature which is compared at error detector 35 to a reference potential from reference source 34. The output potential from the error detector 35 is amplified by power amplifier 36 to provide excitation for motor 18 connected to amplifier 36, as before (see FIGURE 1).

In this instance, however, the rotor of motor 18 is connected by its output shaft 61 through a friction drive connection 60 to rotate shaft 69 in a direction dependent upon the polarity of the signal from error detector 35 at amplifier 36, thereby tending to adjust the position of tap 17 on autotransformer 16 subject to possible slipping of connection 60.

A solenoid 59 is mounted with its rod-shaped armature, i.e. core 63 normally spring-biased into the path of the spokes of wheel 62. Preferably the axis of core 63 is parallel to the axis of shaft 69. Core 63 thus acts as a detent limiting rotation of wheel 62 to an angle equal to that between a pair of adjacent spokes of wheel 62. The movement of core 63 is such that upon energization of solenoid 59 core 63 is retracted from the path of the spokes of wheel 62 to permit rotation of wheel 62 without such restriction.

A switch 67 is mounted with its actuating arm 67a movable in a path parallel to the axis of core 63 and lying in a plane including the axes of core 63 and shaft 69. The actuating surface of actuating arm 67a is shaped slidingly to engage each spoke of wheel 62 through an angle of wheel 62 movement greater than the angle relative to the axis of shaft 69 subtended by core 63 in a manner causing actuating arm 67a to move axially about each such spoke. The positioning of arm 67a is such that switch 67 is actuated by engaging a spoke of wheel 62 just before such spoke abuts against core 63 on each side of such spoke and such that switch 67 remains actuated as the spoke moves past core 63 when the latter is withdrawn.

Switch 67 includes two associated pairs of normally open contacts 67b and 67c which are closed upon actuation of switch 67. Relay 64 is a slow-to-operate and slow-to-release relay, normally operating about one second after energization of its winding and releasing fifteen seconds after such energization, and has a single pair of normally closed contacts 65.

One side of battery 68 is directly connected to one side of the winding of solenoid 59, the other side of which is connected in series through contact pair 67b and contact pair 65 to the other side of battery 68. Similarly the same side of battery 68 is connected through contact pair 67c to one side of the winding of relay 64, the other side of which is connected through contact pair 65 to the other side of battery 68.

In operation of the apparatus of FIGURE 5 the response of motor 18 to signals from amplifier 36 is identical with that of motor 18 in FIGURE 1. Similarly the operation of autotransformer 16 is in all respects the same as that discussed with reference to fine autotransformer 16 in FIGURE 1. When, however, motor 18 in response to a signal from amplifier 36 tends to rotate shaft 69 through connection 60, it will be apparent that as a spoke of wheel 62 approaches core 63 of solenoid 59 it first engages arm 67a causing contact pairs 67b and 67c to close.

The closure of contact pair 67b energizes solenoid 59 withdrawing core 63 from the path of the spokes of wheel 62 permitting the spoke engaging actuator 67a to wipe past actuator 67a. At the same time the closure of contact pair 67c energizes relay 64 which operates after a short time delay to open its contact pair 65. The time delay in rate of operation of relay 64 is such that just sufficient time elapses to permit the spoke then engaging actuator 67a to pass the withdrawn core 63.

As contact pair 65 opens, the circuit energizing both solenoid 59 and relay 64 is broken whereupon core 63 is released into the path of the spokes of wheel 62. If wheel 62 continues to rotate by reason of a continuing signal from amplifier 36 to motor 18, the next spoke adjacent that which passed core 63 engages core 63 stopping rotation of wheel 62 and interrupting the corrective action at autotransformer 16, even though actuator 67a will have been operated sufficiently to close contact pairs 67b and 67c, as contact pair 65 remain open in the time delayed release of relay 64. Connection 60, however, slips permitting motor 18 to continue to rotate, and thus stalling of motor 18 and resultant damage to it is obviated.

After the fifteen second delayed release of relay 64 contact pair 65 returns to normal, closed position. If wheel 62 remains in a position with core 63 engaged with a spoke and hence arm 67a is moved sufficiently to close contact pairs 67b and 67c, core 63 will again be withdrawn, relay 64 will be energized, and the cycle will be repeated.

It will be apparent that the apparatus of FIGURE 5 provides the same interruption in corrective application by a servo system to a controlled device as is provided by the circuit discussed with reference to FIGURE 4 in that the periodic delays in adjustment reduce overadjustment and thereby minimizes hunting. For this reason it will be apparent that the apparatus of FIGURE 5 connecting motor 18 and fine autotransformer 16 can with equal facility be utilized to replace time delay relays 72, 74, 76 and 78 and their associated circuits described with reference to FIGURE 4 as "steady-state operation," since the nature of signals delivered by amplifier 36 to motor 18 does not differ from those delivered by relay 100 and relay 88 to motor 12. It will also be apparent that both the circuit shown in FIGURE 4 and the apparatus in FIGURE 5 can be used to control the output of single variable impedance device as well as the dual systems described with respect to FIGURES 1, 2 and 3 where the advantages of such dual impedance device systems are not required.

I claim:
1. In an apparatus for automatic voltage control including first and second variable impedance devices for interconnection between a power supply and an electrical load whereby the voltage applied by said power supply to said load is a function of the impedance of each said device, the improvement which includes
 (a) a first sensing device associated with said second variable impedance device to be actuated thereby at a predetermined maximum effective impedance thereof,
 (b) a second sensing device associated with said second impedance device to be actuated thereby at a predetermined minimum effective impedance thereof,
 (c) a drive mechanism connected to said first impedance device actuable to change the effective impedance of said first impedance device,
 (d) said first sensing device being connected to said drive mechanism to actuate said device mechanism to increase the effective impedance of said first impedance device upon actuation of said first sensing device,
 (e) said second sensing device being connected to said drive mechanism to actuate said drive mechanism to decrease the effective impedance of said first impedance device upon actuation of said second sensing device, and
 (f) means associated with said drive mechanism actuatable to interrupt periodically the change of the effective impedance of said first impedance device upon actuation of said drive mechanism.

2. The improvement according to claim 1
 (a) in which said drive mechanism includes
  (1) an energization circuit therefor and
  (2) a reversible directional control circuit therefor having a normal mode directing said mechanism in one direction,
  (3) a first relay connected to be actuated upon actuation of each of said sensing devices, (4) a second relay connected to one of said sensing devices to be actuated upon actuation of such sensing device,
(5) said first relay being operatively connected upon actuation thereof to complete said energization circuit of said drive mechanism, and
(6) said second relay being operatively connected upon actuation thereof to actuate said directional control circuit to the reverse mode thereof.

3. The improvement according to claim 2
(a) in which said energization circuit includes
(1) a first normally closed circuit controlling device,
(2) a second normally closed circuit controlling device,
(3) said first and second circuit controlling devices being connected in said energization circuit between said first relay and drive mechanism and each being operable upon energization thereof to interrupt said energization circuit after a predetermined time delay,
(4) said first circuit controlling device being more closely adjacent in connection in said energization circuit to said first relay and being operable after a longer time delay than said second circuit controlling device and
(5) an energization circuit for both said first and second circuit controlling devices connected to a point intermediate the connection of said first and second circuit controlling device in said first named energization circuit whereby said first and second circuit controlling devices are energized upon completion of said first named energization circuit by said first relay.

4. The improvement according to claim 2
(a) in which said drive mechanism further includes
(1) a normally closed circuit controlling device,
(2) a normally open circuit controlling device,
(3) said circuit controlling devices being connected serially in the operative connection between said first relay and the other said sensing device with said normally closed circuit controlling device more closely adjacent said other sensing device,
(4) said normally open circuit controlling device being operable upon energization thereof after a predetermined time delay to close and thereby complete the actuating connection between said other sensing device and said first relay,
(5) said normally closed circuit controlling device being operable upon energization thereof to open and thereby break the operative connection between said other sensing device and first relay after a predetermined time interval longer than that in which said normally open circuit controlling device closes, and
(6) an energization circuit for both said circuit controlling devices including a connection in said actuating circuit for said first relay intermediate the connection therein of said circuit controlling devices.

5. A drive mechanism which includes
(a) an energization circuit therefor,
(b) a reversible directional control circuit therefor having a normal mode directing said mechanism in one direction,
(c) first control device,
(d) second control device,
(e) a first relay connected to each of said devices to be actuated thereby upon actuation of each control device,
(f) a second relay connected to one of said control devices to be actuated thereby upon actuation of said one control device,
(g) said first relay being operatively connected upon actuation thereof to complete said energization circuit for said drive mechanism,
(h) said second relay being operatively connected upon actuation thereof to actuate said directional control circuit to the reverse mode thereof, and
(i) said energization circuit including serially between the operative connections of said first relay and said drive mechanism to said energization circuit
(1) a first normally closed circuit control device,
(2) a second normally closed circuit controlling device,
(3) said first circuit controlling device being connected more closely adjacent the operative connection of said first relay to said energization circuit and operable upon energization to interrupt said energization circuit after a time delay,
(4) said second circuit controlling device being operable upon energization thereof to interrupt said energization circuit after a shorter time delay than first circuit controlling device and
(5) an energization circuit for both said first and second circuit controlling devices including a connection to said first named energization circuit for said drive mechanism at a point intermediate the connection therein of said first and second circuit controlling device.

6. A drive mechanism which includes
(a) an energization circuit therefor,
(b) a reversible directional control circuit therefor having a normal mode directing said mechanism in one direction,
(c) first control device,
(d) second control device,
(e) a first relay connected to each of said devices to be actuated thereby upon actuation of each control device,
(f) a second relay connected to one of said control devices to be actuated thereby upon actuation of said one control device,
(g) said first relay being operatively connected upon actuation thereof to complete said energization circuit for said drive mechanism,
(h) said second relay being operative connected upon actuation thereof to actuate said directional control circuit to the reverse mode thereof,
(i) a normally closed circuit controlling device,
(j) a normally open circuit controlling device,
(k) said circuit controlling devices being connected serially in the operative connection between said first relay and the other said control device with said normally closed circuit controlling device more closely adjacent said other control device,
(l) said normally open circuit controlling device being operable upon energization thereof after a predetermined time delay to close and thereby complete the actuating connection between said other control device and said first relay,
(m) said normally closed circuit controlling device being operable upon energization thereof to open and thereby break the operative connection between said other control device and first relay after a predetermined time interval longer than that in which said normally open circuit controlling device closes and
(n) an energization circuit for both said circuit controlling devices including a connection in said actuating circuit for said first relay intermediate the connection therein of said circuit controlling devices.

7. A drive mechanism which includes
(a) control means,
(b) a drive motor for operating said mechanism operatively connected to said control means for initiating operation of said drive mechanism upon actuation of said control means,
(c) a drive element for connection to a load to be driven by said drive mechanism,
(d) slip means connecting said motor to said drive element to releasably move said element,
(e) limit means associated with said drive element positioned to engage said element and thereby limit movement of said drive element upon a predetermined amount of such movement,
(f) means responsive to a position of said limit means and said drive element approximating engagement therebetween,
(g) means associated with said limit means
   (1) actuatable to withdraw said limit means to a position clear of said drive element and
   (2) connected to said responsive means to be actuated thereby, and
(h) delay means in the connection of said responsive means to said last named means to impose a predetermined delay in actuation of said last named means, whereby operation of said drive mechanism is interrupted.

8. The apparatus of claim 1
(a) wherein said second variable impedance device is an autotransformer including
   (1) a winding and
   (2) an output tap movable along said winding to vary output of said transformer selected thereby, and
(b) in which said first and second sensing devices are positioned in the path of said tap along said winding to be engaged by said tap and thereby actuated at positions of said tap corresponding respectively to predetermined maximum and minimum effective outputs selected by said tap.

9. The apparatus of claim 1
(a) wherein each said impedance device is a variable autotransformer including
   (1) a winding and
   (2) an output tap movable along said winding to vary the effective output of said transformer selected thereby,
(b) the winding of a first said autotransformer being adapted to be connected across an A.C. power source,
(c) the winding of the second said secondary autotransformer being connected between one side of the winding of said first autotransformer and the output tap thereof, and
(d) said second autotransformer being adapted for connection to a load between one side of the winding of said second autotransformer and the output tap thereof.

10. The apparatus of claim 1
(a) wherein each said impedance device is a variable autotransformer including
   (1) a winding and
   (2) an output tap movable along said winding to vary the effective output of said transformer selected thereby,
(b) in which said apparatus further includes a step-down transformer having
   (1) a primary winding and
   (2) a secondary winding
(c) the winding of the first said autotransformer being adapted to be connected across an A.C. power source,
(d) said primary winding of step-down transformer being adapted for connection across an A.C. power source,
(e) said winding of the second said autotransformer being connected across said secondary winding of said step-down transformer,
(f) said output tap on said first autotransformer being connected to one side of the winding of said second autotransformer, and
(g) the output tap on said second autotransformer and one side of said winding of said first autotransformer being adapted for connection to a load.

11. The apparatus of claim 1
(a) wherein each said impedance device is a variable autotransformer including
   (1) a winding and
   (2) an output tap movable along said winding to vary the effective output of said transformer selected thereby,
(b) in which said apparatus further includes a step-down transformer having
   (1) a primary winding and
   (2) a secondary winding
(c) the winding of a first said autotransformer being adapted to be connected across an A.C. power source,
(d) said primary winding of said step-down transformer being connected between said output tap on said first autotransformer and one side of the secondary winding of said step-down transformer,
(e) the winding of the second said autotransformer being connected across said secondary winding of said step-down transformer, and
(f) the output tap on said second autotransformer and one side of said winding of said first autotransformer being adapted for connection to a load.

References Cited by the Examiner

UNITED STATES PATENTS

| | | | |
|---|---|---|---|
| 1,874,824 | 8/1932 | Snyder et al. | 323—43.5 |
| 2,071,984 | 2/1937 | Minneci | 323—43.5 |
| 3,044,008 | 7/1962 | Cooley | 323—43.5 |
| 3,100,865 | 8/1963 | Nielsen | 323—43.5 |
| 3,128,424 | 4/1964 | Cooley et al. | 323—47 |
| 3,211,990 | 10/1965 | Gibson | 323—43.5 |

JOHN F. COUCH, *Primary Examiner.*

LLOYD McCOLLUM, *Examiner.*

W. E. RAY, *Assistant Examiner.*